Fig. 4

Nov. 1, 1960  E. H. AHLEFELD, JR., ET AL  2,958,095
MACHINE FOR MAKING MOLDED BODIES
Filed Sept. 25, 1957  8 Sheets-Sheet 8

INVENTORS
Edwin H. Ahlefeld Jr.
BY Donald F. Spengler
ATTORNEYS

United States Patent Office 2,958,095
Patented Nov. 1, 1960

2,958,095

MACHINE FOR MAKING MOLDED BODIES

Edwin H. Ahlefeld, Jr., Woodbridge, and Donald F. Spengler, Milford, Conn., assignors to Molded Rubber Products Corporation, Milford, Conn., a corporation of Connecticut Filed Sept. 25, 1957, Ser. No. 686,190

7 Claims. (Cl. 18—4)

This invention relates to machines for making molded bodies and relates more particularly to machines for making molded bodies from a coherent mass of moldable plastic material.

It is an object of this invention to provide an improved machine for making from a workable mass of plastic material relatively small molded bodies such as bumpers for doors, seats, etc., stoppers for various purposes, grommets, engine mounts, heels and the like. Further objects of this invention are the provision of a machine of the character referred to by which such molded plastic bodies may be produced more rapidly, at less cost and with reduced wastage of plastic material as compared with currently used expedients for making such molded bodies.

A further object of this invention is to provide a machine for making molded bodies of the character referred to in a continuous operation which preferably carries through from the occurrence of the plastic material as an unformed coherent mass to the discharge of finished molded products. It is a further object of this invention to provide an improved machine for making molded bodies of the character aforesaid which includes provision for treating the plastic material while in the mold as, for example, by application of heat in case of a vulcanization step or the like. Alternatively, in the case of a thermoplastic material, the treating step may consist merely of a dwell while in the mold until there is cooling sufficient to permit discharge of the molded body from the machine.

The nature and utility of this invention may be better understood by illustration and exemplification in connection with the making of molded bodies from rubber, the bodies being initially molded from unvulcanized rubber and being vulcanized while confined within the mold. Molded bodies of the character above referred to are currently manufactured from rubber by the technique commonly referred to as "compression molding." In compression molding the rubber mix is initially prepared in any suitable way, as by mixing rubber with filler material such as carbon black, clay and the like and curatives such as sulphur, zinc oxide and the like. This usually is done in a Banbury mixer or a 2-roll rubber mill, or a combination of both. After the unvulcanized rubber mix has been prepared, it is worked on a warm-up mill and fed to an extruder and is extruded in rod form. Extruded rod material either immediately or after storage is next taken to a cut-off machine which cuts off from the rod material slugs or pre-forms of suitable size for introduction, respectively, into mold cavities having the contours of the particular body to be produced for compression therein utilizing a hydraulic press. The slugs or pre-forms are individually introduced by an operator into the mold cavities contained in the press platen of the press wherein they are compressed and likewise are subjected to heat and pressure for a sufficient length of time to vulcanize or otherwise cure the rubber composition. The heat for vulcanizing or other curing is generally provided by the use of steam heated platens.

After curing, the press is opened and the molded and cured bodies are removed. To facilitate such removal it is current practice to introduce sufficient rubber in the slug or pre-form state so as to more than fill the mold cavities, with the result that the rubber overflows the mold cavities and provides a connecting web between the platens whereby the molded bodies are joined by the connecting web material so that all of the molded bodies may be removed from the press while joined together in a sheet-like body in a single operation. The die platens used in hydraulic presses of the type most commonly used range from about 20 inches up to about 48 inches square and the number of individual mold cavities per platen usually is of the order of 50 to 200.

Upon removal of the molded bodies joined together in sheet form from the press it is necessary to remove the web material which joins the molded bodies. Two expedients have been resorted to for this purpose. One of these expedients is to remove the web material of "flash" with specially shaped die knives, which usually are referred to as "dinkers." The other expedient is that of tumbling the bodies with the web material still attached thereto in a tumbling machine which is sometimes loaded with Dry Ice. The Dry Ice renders the rubber very brittle and since the flash presents a thin section it breaks off from the molded body and may be separated in this way.

A principal disadvantage of the foregoing steps usually employed in making molded bodies of the character referred to results from the amount of manual labor required, manual labor being required for each of the steps enumerated below:

(1) Warm-up on mill
(2) Extrusion in rod form
(3) Cutting pre-forms from rod
(4) Loading mold cavities with pre-forms
(5) Closing hydraulic press
(6) Opening hydraulic press
(7) Unloading press
(8) Trimming off the flash A further disadvantage of current practice is that the rate of production of the molded bodies is severely limited in relation to equipment cost and plant space required.

A still further practical disadvantage that is incident to current practice results from the fact that the flash that is deliberately produced in order to simplify the removal of molded bodies from the press results in a material loss of anywhere from 15% to 50%. In the case of molded rubber bodies the flash is, of course, vulcanized in the operation and therefore requires reclaiming for reuse. In most commercial operations the scrap resulting from the recovery of flash is not such as to justify a reclaiming operation, and it represents a complete loss to the manufacturer.

Further objects and advantages of this invention are concerned with overcoming the disadvantages and drawbacks which are incident to current practice and technique in the production of molded bodies by compression molding.

A principal object and advantage of this invention is to greatly reduce the amount of manual labor required for production of finished molded bodies. More particularly, according to this invention, the manual labor incident to seven of the steps outlined above, namely, steps (2) through (8), have been eliminated altogether.

A second object and advantage of this invention is that of greatly reducing scrap loss. Thus scrap losses running from a minimum of about 15% and sometimes as much as 50% according to current compression molding techniques may be reduced so as to be less than 1%.

A further object and advantage of this invention is to very substantially increase the rate of production of molded bodies in relation to plant investment.

A further object and advantage of this invention is to reduce the number of processing steps prior to vulcanization and thereby cut down the time which has to be allowed prior to vulcanization, thereby permitting the use of compositions that cure more rapidly and permitting a shorter time cycle for curing.

A still further object and advantage of this invention resides in the utilization of a machine whereby the bodies after molding may be subjected to higher curing temperatures than those ordinarily employed. In hydraulic presses used in compression molding the platens are generally heated with steam and the maximum vulcanization temperature obtainable is approximately 350° F. The improved machine of this invention readily permits employment of considerably higher curing temperatures of the order of 400°–500° F. and at such temperatures a shorter curing cycle may be employed, with resultant increase in rate of production of molded bodies.

Features of this invention relate to the general organization of the machine for the purposes and objectives aforesaid. More particular features of this invention relate to the means and mechanism whereby an unformed coherent body of workable plastic material is charged into mold cavities in a continuous operation. More particular features relate to the charging of the mold cavities by the employment of sheet-forming means and the blanking of molded bodies from a sheet produced thereby, means preferably being provided for returning residual sheet material to a bank of unformed plastic material at the sheet-forming means.

Further features of this invention relate to the provision of endless carrier means which carry a succession of mold presenting members continuously in operative relation with respect to blanking means, to means for removing residual material, to mold closing means, to a treating zone, to mold opening means spaced substantially from the mold closing means and to means for ejecting finished molded bodies. Means preferably is provided for returning residual sheet material to the sheet-forming means and there may be means for subjecting the contents of the mold to treatment such as vulcanization during travel between the station at which the molds are closed and the station where the molds are reopened.

Further features of this invention relate to the manner by which the mold presenting members are carried by endless carrier means and to the mechanisms whereby the mold cavities are presented for blanking and whereby after vulcanization or other treatment the finished molded bodies are ejected from the mold cavities.

Further features of this invention relate to the provision of second endless carrier means for carrying mold closing members adapted and arranged for travel synchronously with the mold presenting members carried by the first endless carrier means whereby the mold cavities are effectively closed, remain closed during a substantial distance of travel and thereafter are opened after completion of the desired treating period.

Further objects, features and advantages of this invention will become apparent from the following description of typical embodiments of this invention, which are shown for the purposes of exemplification and illustration, in the accompanying drawings, wherein.

This invention will first be described in connection with the preferred embodiment of this invention shown in Figs. 1 to 13.

A conventional 2-roll arming mill is indicated generally by the reference character 20 and may be employed for continuously producing a continuous sheet 21 from an unformed bank 22 of uncured, coherent, workable rubber composition which has been prepared for molding and vulcanizing the particular molded body to be produced. Other means for producing a continuous sheet may, if desired, be employed. The rubber composition may be supplied to the mill in any suitable way to make up for that going into the finished molded bodies. The warming machine comprises the power driven rolls 24 and 25 which work the rubber composition, until it attains the desired temperature for molding, by forming and reforming the material into the sheet that is carried from the nip between rolls 24 and 25 by the roll 25. In order to form the continuous sheet or strip 21, a portion of the sheet formed on the roll 25 is cut away, and is separated therefrom by passing it upwardly so as to be transported by the endless conveyor 26. The rolls 24 and 25 are interconnected by suitable gearing (not shown) and conventional means (not shown) is employed for varying the spacing at the nip between the rolls which controls the thickness or gauge of the sheet taken off. The endless conveyor 26 is mounted for travel about and between the rotatably mounted cylinders 27 and 28. The sheet 21 becomes separated from the endless conveyor 26 after having passed over the upper portion of the cylinder 28 and travels downwardly onto the surface of the blanking cylinder 31 so as to be carried thereby for becoming continuously presented at the lower portion of the blanking cylinder to the mold presenting members successively brought into operative relation with respect to the moving sheet 21, the plastic material then being blanked from the sheet 21 into the mold cavities by mechanisms and in the manner that will be described more in detail hereinbelow. Preferably the pressure exerted by the blanking cylinder 31 against the mold cavities is resiliently and adjustably applied as by the spring loading means 31a. The cylinders 28, 29 and 31 are driven by any suitable means such as chain 23 driven from the shaft on which the sprocket wheels 45 are mounted.

The residual sheet material 21a which has had the mold charges blanked therefrom but, nevertheless, is in the nature of a continuous foraminous sheet, is taken up onto the endless conveyor 30. When the residual sheet 21a passes over the rotatably mounted cylinder 32 at the other end of the endless conveyor 30, it is discharged therefrom, becoming reunited with the bank of unformed rubber composition that is being processed on the warm-up mill 20. It may be noted, particularly in connection with Fig. 3, that the returned residual sheet 21a is fed into the warm-up mill substantially out of line with respect to where the sheet 21 is taken from the roll 25, thereby avoiding any interference in conveyor travel while nevertheless utilizing simple endless conveyor belt means for transporting the continuous sheet to the blanking station and returning the residual sheet to the sheet-forming means.

The mechanisms for blanking plastic material from the continuously moving sheet 21 for reception in mold cavities presented by a succession of mold presenting members, the closing of the cavities, the movement of the closed cavities through a treating zone, the opening of the mold cavities and the ejection of molded bodies from the cavities will now be described. Before describing these mechanisms in greater detail reference first will be made to the general organization of these mechanisms as shown schematically in Fig. 1.

A succession of mold presenting members 33 are carried by and with the upper endless carrier 34 which comprises spaced sprocket chains that pass over idler sprocket wheels 35 at the feed end of the machine and driven sprocket wheels 35a at the discharge end. While the mold presenting members 33 and the means by which they are carried by the carrier 34 will be described more in detail hereinbelow, it may be mentioned at this point that the members 33 are secured to the ends of pusher rods 36 which have cam follower rollers 37 rotatably secured on the opposite ends thereof and which pass in longitudinally slidable relation through the carriage blocks or members 38 that have the marginal rollers 39 rotatably secured on opposite sides thereof so as to form a succession of carriages. The carriage blocks 38 are directly secured successively to the endless carrier 34 and move therewith carrying the members 33.

Figure 1:
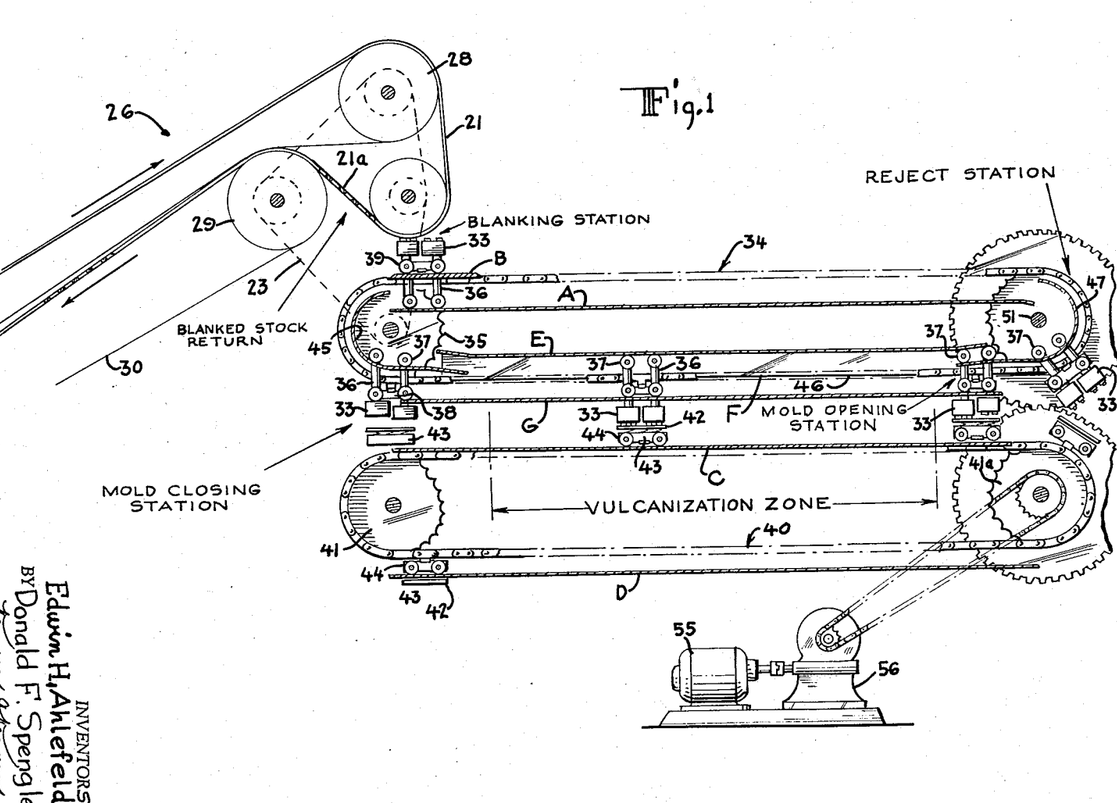
Fig. 1 is a largely schematic side elevation of a machine embodying this invention.

In Fig. 1 the mold presenting members 33 and the carriages comprising carriage blocks 38 are only shown at representative positions in their orbit of travel. However, it is to be understood that the carriage blocks 38 with the members 33 carried thereby follow in immediate succession with respect to each other along the total length of the endless carrier 34. For example, the carriage blocks 38 may be slightly less than 6 inches square and secured to the endless carrier 34 at 6-inch intervals.

When the carriage blocks 38 and the mold presenting members 33 are at the blanking station immediately underlying the blanking cylinder 31, it may be noted that the rollers 37 at the ends of the pusher rods 36 are in contact with and are supported by the fixed track A which is positioned with reference to the peripheral surface of the blanking cylinder 31 so that when the blanking members 33 pass under the blanking cylinder 31 plastic material from the sheet 21 will become pressed into the mold cavities in the members 33. The moving parts of the machine are synchronized so that the rate of movement of the members 33 during passage through the blanking station is at least approximately or substantially the rate of travel of the sheet 21 of plastic material as it is carried on the peripheral surface of the blanking cylinder 31. At the blanking station the position of carriage blanks 38 preferably is steadied and controlled by causing the rollers 39 of the carriage block 38 to rest upon the tracks B.

In order to close the mouths of the mold cavities upon leaving the molding station so that the contents may be confined during vulcanization or other treatment, a second endless carrier 40 is provided underneath the endless carrier 34. The endless carrier 40 may likewise be provided by a pair of sprocket chains passing over the idler sprocket 41 at the feed end of the machine and the driven sprocket 41a at the discharge end. At intervals and spacing corresponding to the number and spacing of the carriage blocks 38, the carrier 40 has secured thereto for moving therewith the carriage blocks or members 43 to which the marginal rollers 44 are rotatably secured to provide rolling friction with the upper tracks C and the lower tracks D and serve as cam followers relative to said track C. The carriers 34 and 40 are caused to move at the same speed and the carriage blocks 43 are so secured to the carrier 40 that when the mold closing members 42 carried by the blocks 43 reach the closing station at the forward or feed end of the carriers they will come into opposed relation with the mold presenting members 33 for closing the mouths of the mold cavities. In order to facilitate the bringing of the mold presenting members into opposed pressure contact with the surfaces of the mold closing members 42 smoothly and without jarring, the pusher rods 36 are retracted relative to the carriage blocks 38 by means of the coaction of the cam tracks 45 with the rollers 37.

When the rollers 37 at the ends of the pusher rods 36 leave the cam tracks 45, they come under the influence of the cam track E so that they, together with the pusher rods 36, serve to press the mold presenting members 33 against the mold closing members 42, the parts then being in the position as indicated in the vulcanization zone. At this time the rollers 44 of the carriage blocks 43 rest upon the tracks C for completing the means for maintaining the mold cavities closed. During this condition of travel the rollers 39 of the carriage blocks 38 are steadied by disposition between the under surfaces 46 of the tracks F and the upper surfaces of the tracks G.

As the mold presenting members 33 approach the mold opening station, the rollers 37 at the ends of the pusher rods 36 are retracted relative to the carriage blocks 38 by the action thereon of the cam tracks 47. This facilitates the separation of the mold closing members from the mold presenting members. Moreover, as will be described more in detail hereinbelow, the contour of the cam tracks 47 is such as to retract the mold presenting members 33 relative to the carriage blocks 38 sufficiently to cause actuation of an ejection plunger for each of the mold cavities whereby the molded body is ejected from each of the mold cavities. Upon again causing the pusher rods 36 to be advanced relative to the carriage blocks 38 so that the parts are restored to their position at the blanking station, the cycle of operation becomes completed and may be continuously repeated. The rate of travel of the endless carriers 34 and 40 is adjusted in relation to the length of travel through the vulcanization zone so that the molded bodies may be brought up to vulcanizing temperature and held at such temperature until desired vulcanization is accomplished. The molded bodies are thus produced in a vulcanized condition in a continuous operation.

Figure 2:
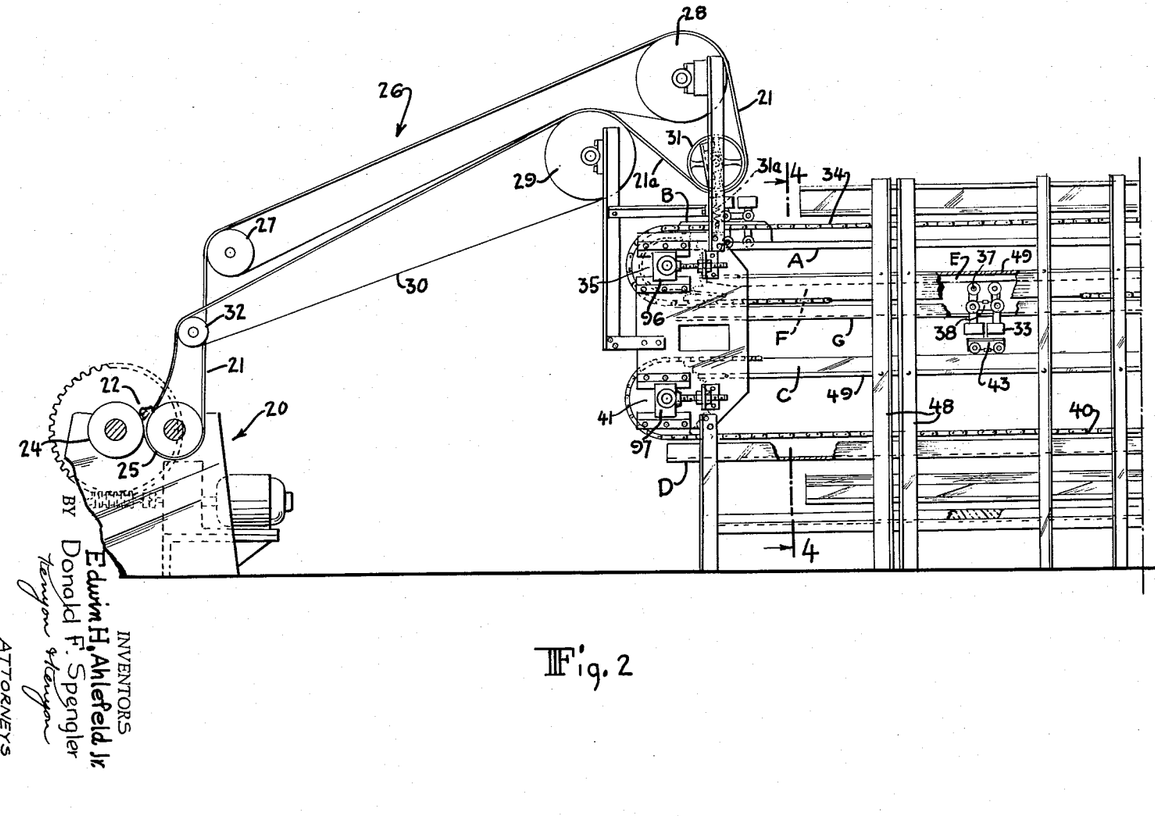
Fig. 2 is a side elevation of the feed end of the machine of Fig. 1.
Figures 2A, 3:
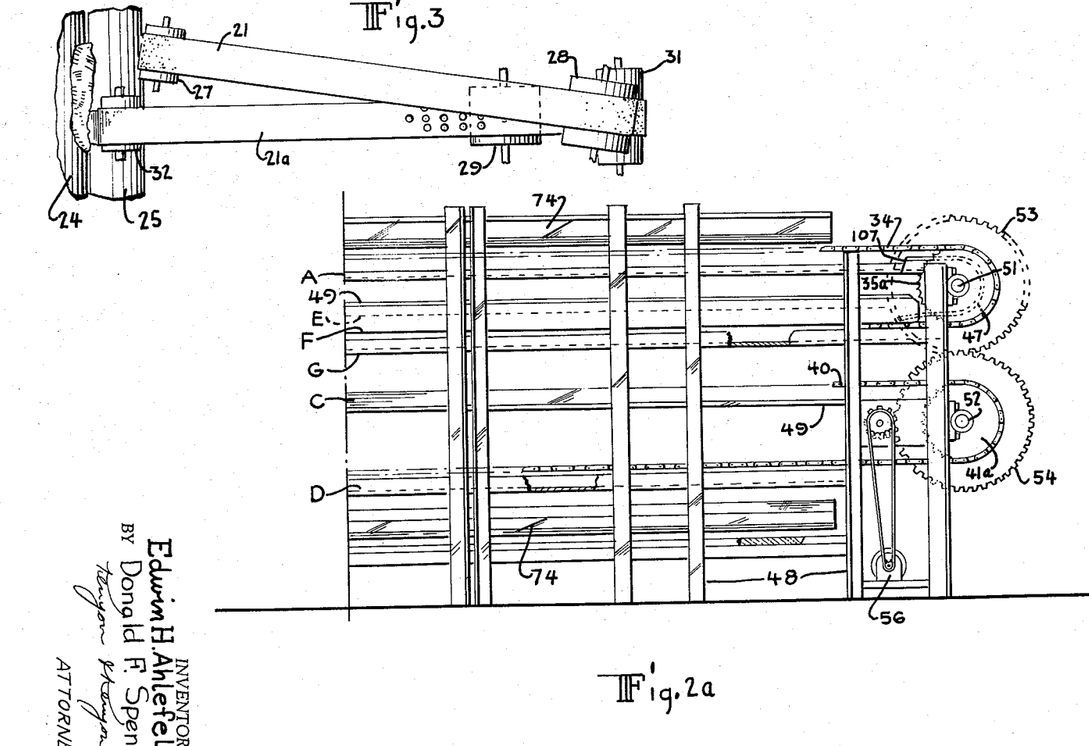
Fig. 2a is a side elevation of the discharge end of the machine, Fig. 2a being a continuation of Fig. 2.
Fig. 3 is a plan view of the feed means for the machine.
Figure 4:
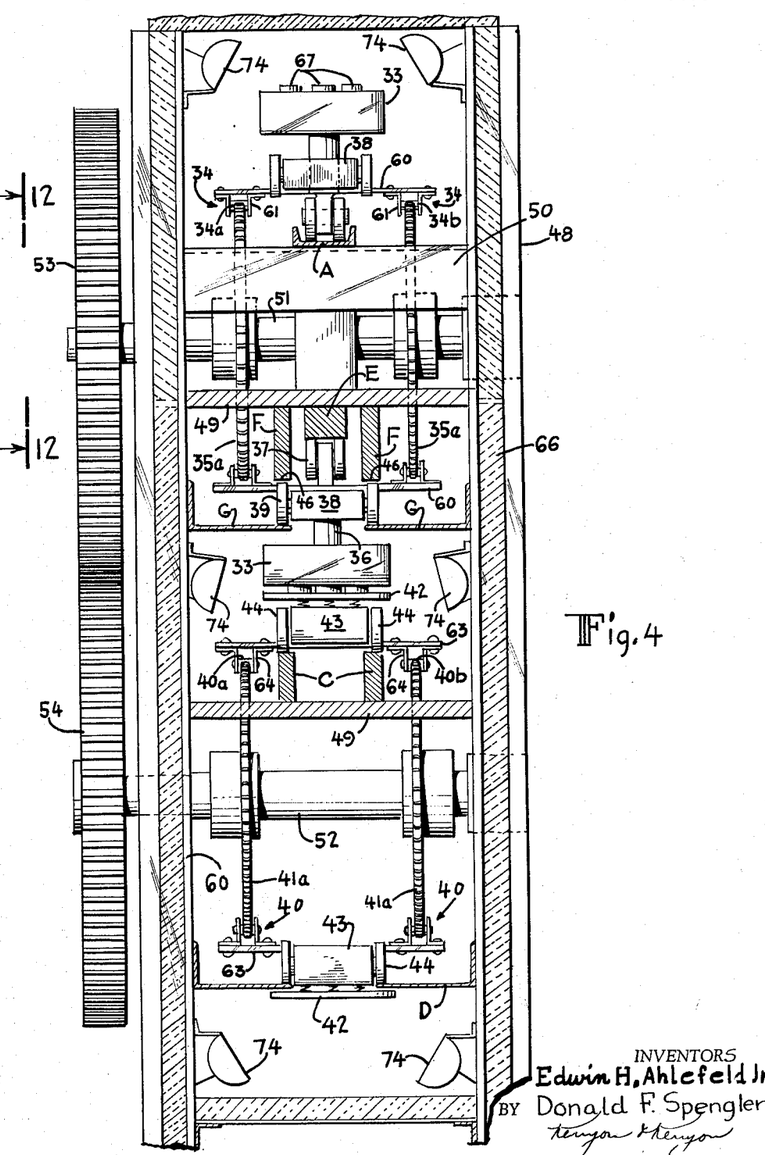
Fig. 4 is a sectional elevation on a larger scale taken on the line 4—4 of Fig. 2.

As shown more particularly in Figs. 2, 2a and 4, the portion of the machine which comprises the mold carrying elements may be provided with a suitable frame support such as the vertically disposed frame members 48, the horizontal longitudinally disposed frame members 49 and the horizontal transverse frame elements 50. The upper endless carrier 34 consists essentially of a pair of spaced sprocket chains 34a and 34b which are supported by the rotatively mounted idler sprocket wheels 35 at the feed end of the carrier and by the driven rotatively mounted sprocket wheels 35a at the discharge end of the carrier. Similarly, the lower carrier 40 comprises the pair of sprocket chains 40a and 40b which are supported by the rotatively mounted sprocket wheels 41 at the feed end of the carrier and by the driven rotatively mounted sprocket wheels 41a at the discharge end of the carrier. The sprocket wheels 35a and 41a, respectively, are secured to the rotatively mounted shafts 51 and 52 which, respectively, are driven by the gears 53 and 54 that intermesh, as best shown in Fig. 4, so that the carriers 34 and 40 will at all times remain synchronized as regards the rate of travel of the elements carried thereby. Power may be supplied as from a motor 55 through a reduction gear mechanism 56, which preferably is adjustable so that the rate of travel of the mold elements through the vulcanization zone may be adjusted for controlling the duration of the period of exposure of the mold elements to the conditions maintained in the vulcanizing zone. In order to facilitate the accurate registration of the mold presenting elements 33 carried by the carrier 34 with reference to the mold closing elements 42 carried by the carrier 40, it is preferable to provide adjusting means such as that shown in Figs. 12 and 13. As shown in these figures, the shaft 51 has a flanged collar member 57 secured thereto, the position of the sprocket wheel 53 being adjustable relative to the collar 57 within the limits provided by the slot 58 in the collar 57 and the bolt 59 which is threaded into one of the spokes of the sprocket wheel 53. Adjustment is permitted when the bolt 53 is loosened relative to the collar 57 and after the desired adjustment has been effected the bolt 59 may be tightened so as to preserve the proper adjustment. The idler sprocket wheel 35 at the feed end of the carrier 34 and the idler sprocket wheel 41 at the feed end of carrier 40 are preferably mounted for rotation with reference to adjustable take-up blocks 96 and 97, respectively.

Figure 6:
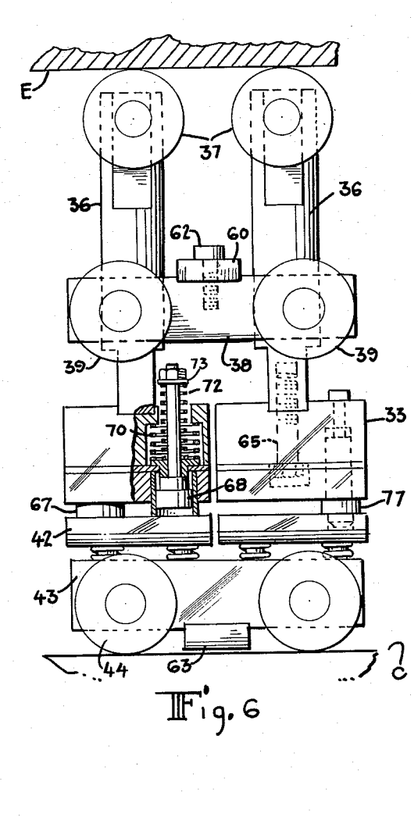
Fig. 6 is a side elevation, partly in section, of the parts shown in Fig. 5.

At successive intervals corresponding to the desired intervals for carrying the carriage blocks 38 the carrier 34 is provided with support bars 60 which are secured to bent lugs 61 that are integral with links of the sprocket chains 34a and 34b so as to extend transversely from one to the other, as best shown in Fig. 4. Each of the carriage blocks 38 is secured to a crossbar 60 as by the use of suitable bolts 62 (Fig. 6). Similarly, the carriage blocks or members 43 are secured to the cross bar 63, which in turn is secured to bent lugs 64 that are integral with sprocket chains 40a and 40b.

Each of the pusher rods 36 which traverses the carriage blocks 38 in slidable relation thereto has one of the mold presenting members 33 secured thereto as by means of a bolt 65 (Fig. 6). The rollers 37 are rotatively mounted at the opposite ends of the pusher rods 26.

Figure 5:
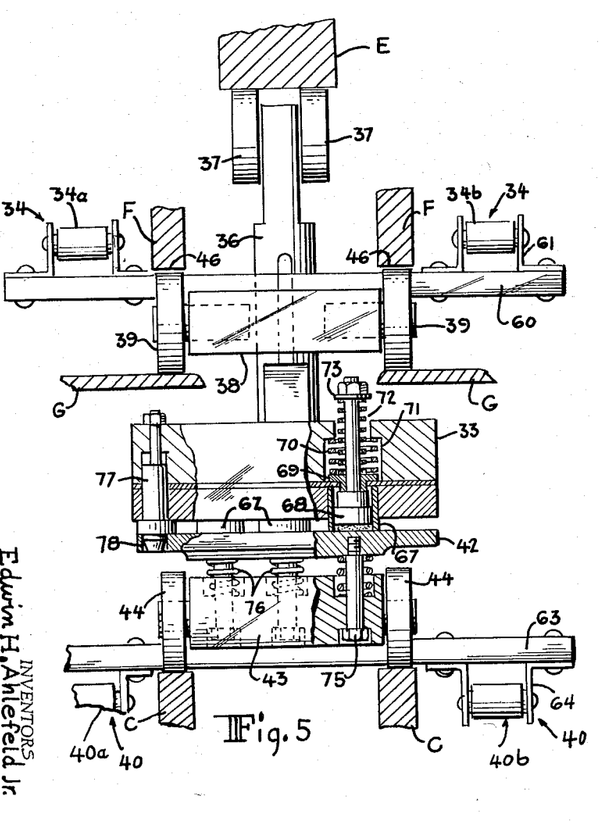
Fig. 5 is an end elevation, partly in section, of upper and lower carriage assemblies in opposed relation.
Figure 7:
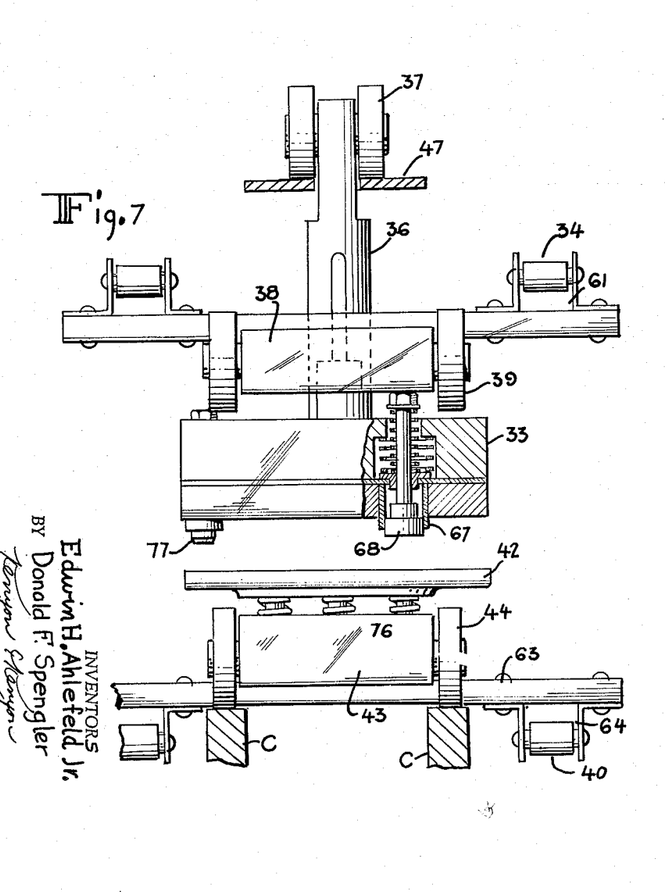
Fig. 7 is similar to Fig. 5 showing the parts in a different relative position.

Each of the mold presenting members 33 comprises at least one and ordinarily a plurality of mold cavities having an open mouth whose depth is determined by the normal position of an ejecting plunger. As shown in Figs. 5, 6 and 7, the side wall of each mold cavity is provided by the blanking member 67 within which the ejecting plunger 68 is slidable. The normal position of the ejecting plunger 68 which forms the bottom of the mold cavity is controlled by the limit washer 69 which is urged forwardly by the compression spring 70 that is confined within the recess 71. This structure permits the plunger 68 to float during the blanking operation when the sheet of plastic composition is pressed against each of the mold presenting members 33 in succession for effecting the blanking operation whereby the plastic material is pressed into the mold cavities from the sheet 21. A substantial amount of play or float of the ejection plungers is preferable in that it allows for possible variations in the thickness of the sheet from which the rubber or other plastic material is blanked at the blanking station. Moreover, such play or float is desirable in that if the sheet fed for blanking were to be thicker at some points than others there would be danger of the thicker material preventing proper closure of all of the mold cavities, with the result that all of the molded bodies in the mold cavities would be defective and have to be rejected.

The ejection plunger 68 of each mold cavity is maintained in retracted position by the compression spring 72 that is confined between the limit washer 69 and the washer 73.

With reference to the mold closing means carried by the lower endless carrier, each of the carriage blocks 43 has a mold closing member 42 carried thereby by means of bolts 75 and the members 42 are maintained substantially spaced from the carriage blocks 43 by means of the compression springs 76 interposed therebetween. Such mounting of the mold closing members 42 permits a substantial amount of self-adjustment in closing the mold cavities and maintaining them closed during travel through the vulcanization or other treating zone, thereby providing tolerance for possible variations in machining and differences in thermal expansion under different temperature conditions. The springs 76 provide adequate unit pressure for effectively closing the mold cavities, the unit pressure provided by the springs 76 normally being substantially greater than the unit pressure provided by the springs 69 in the mold presenting members.

In Figs. 5 and 6 the parts are shown in the position which they occupy during travel through the vulcanizing or other treating zone. It is to be noted that the mold closing member 42 is held pressed against the mouth of each blanking member 67 presented by the mold presenting member 33 by virtue of the confinement provided by the rollers 44 bearing against the tracks C and the rollers 37 bearing against the track E, the confinement being such as to provide a substantial amount of compression of the springs 76.

In order that the registration between the mold closing members 42 and the mold presenting members 33 may be as accurate as possible, it is preferable to provide taper-pointed dowel pins 77 mounted so as to protrude from the mold presenting members 33 and fit slidably into corresponding recesses 78 in the mold closing members 42 when these parts are brought into juxtaposition at the mold closing station.

Figure 8:
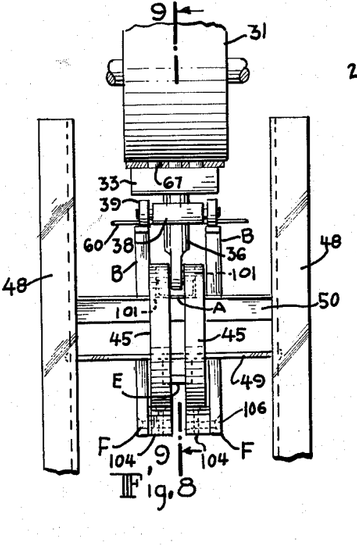
Fig. 8 is an enlarged detail elevation of the upper portion to the front end of the molding and treating unit comprising the blanking means.
Figure 9:
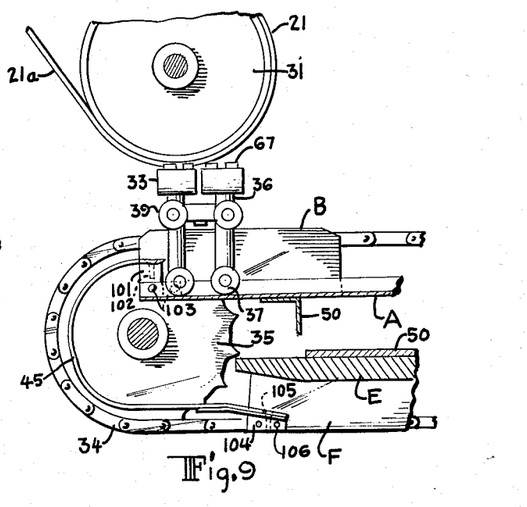
Fig. 9 is a sectional elevation taken on the line 9—9 of Fig. 8.
Figures 10, 12:
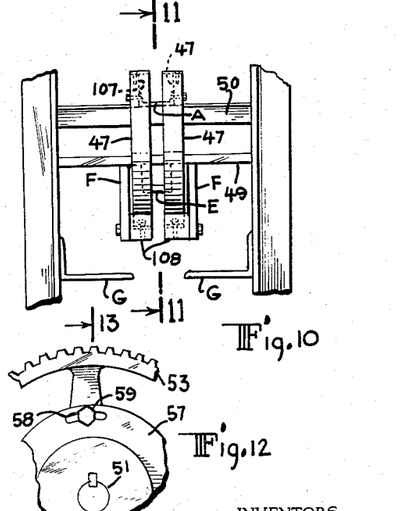
Fig. 10 is an enlarged detail elevation of the upper portion of the rear end of the molding and treating unit comprising cam for effecting release of molded bodies.
Fig. 12 is an enlarged detail view of one of the driving gears viewed from 12—12 of Fig. 4 showing adjustable gear synchronizing means.
Figure 11:
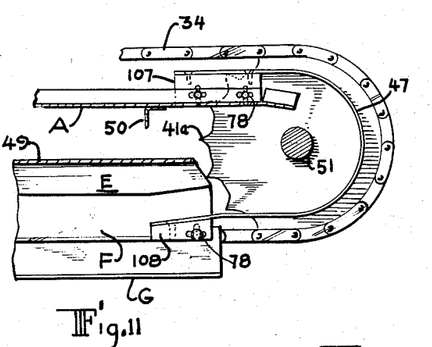
Fig. 11 is a sectional elevation taken on the line 11—11 of Fig. 10.
Figure 13:
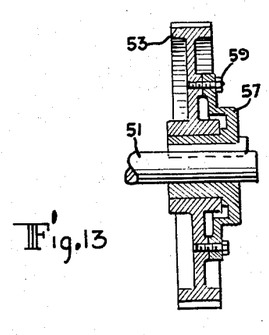
Fig. 13 is a section taken on the line 13—13 of Fig. 12.

The position of the parts during blanking is shown most clearly in Figs. 8 and 9. As shown in these figures, when the mold presenting members 33 pass underneath the blanking cylinder 31 the blanking members 67 are pressed into the sheet 21 by the confinement provided by the blanking cylinder 31 and the action of the track A which is supported by cross members 50 and which bear against the rollers 37 at the opposite ends of the pusher rods 36. As also shown in Figs. 8 and 9, the cam tracks 45 are secured adjacent the forward end of the track A by the blocks 101 and bolts 102, 103 and to the forward end of the track F by the blocks 104 and bolts 105, 106. The cam tracks 45 engage the rollers 37 so as to retract the pusher rods 36 somewhat relative to each of the carriage blocks 38, thereby facilitating the closing of the molds when the mold presenting members 33 and the mold closing members 42 approach each other at the mold closing station. Preferably the position of the cam tracks is adjustable both vertically and in the longitudinal direction of the carrier 34.

Upon leaving the cam tracks 45, the rollers 37 come under the influence of the track E for maintaining the molds closed throughout their travel through the vulcanization or other treating zone as hereinabove described. At the same time, the weight of the carriage blocks 38 is relieved from the sprocket chains of the endless carrier 34 by having the rollers 39 become supported by the tracks G, the position of the carriage blocks 38 preferably being further controlled by the under surface of the tracks F.

When the molds approach the mold opening station the travel of the rollers 39 of the carriage blocks 38 between the tracks F and G becomes completed and the confinement provided by the rollers 37 for the pusher rods 36 bearing against the track E also becomes completed. At the same time, the rollers 37 come under the influence of the cam tracks 47, as shown in greater detail in Figs. 7, 10 and 11. The cam tracks 47 are secured to blocks 107 which in turn are secured to the rearmost end of the track A and are secured to the blocks 108 which in turn are secured to the rearmost ends of the tracks F. Preferably, the cam tracks 47 may have their position adjusted by means of the adjustable connection means indicated diagrammatically at 78 in Fig. 11. The adjustment of the cam track 47 is such that when the rollers 37 come under its influence the pusher rods 36 are retracted while the position of the carriage blocks 38 is determined by the crossbars 60 as they are carried by the sprocket chains 34a and 34b in passing over the sprocket wheels 35, the pusher rods 36 being retracted until the parts are brought to the position shown in Fig. 7 with the ejection plunger 68 for each mold cavity pressed forwardly by the carriage blocks against the action of the compression springs 72 which normally hold the ejection plungers 68 in retracted position. Each ejection plunger becomes thrust outwardly relative to the wall of the mold cavity so that the finished molded bodies are freed for removal from the machine. If the finished bodies do not fall off by gravity at the rejection station, the bodies may be blown off with a high pressure air jet or may be knocked off as by the use of a counter-rotating brush.

After the finished bodies have thus been ejected from the mold cavities, the rollers 37 become separated from the influence of the cam tracks 47, thus permitting the parts to return to the position shown in Figs. 8 and 9 during the travel of each mold presenting member 33 along the upper reach of the endless carrier 34 back to the blanking station.

As best shown in Fig. 4, provision is made for subjecting the contents of mold cavities during their travel through the vulcanization zone to heat for maintaining the contents of the molds at desired vulcanization temperature. In the embodiment shown the heating means employed consists of infrared lamps 74. Preferably, the heating means applies heat to the mold presenting and mold closing members not only during travel through the vulcanization zone but also during their return travel to the feed end of the machine. In this way heat losses during return travel may be avoided and the contents of the mold cavities may be brought to vulcanization temperature in a minimum of time. While infrared lamps are regarded as preferable, other forms of heating means may be employed, such as gas jets, steam or other electric heating devices. Preferably a suitable heat insulating material 66 is provided.

While heating means may be employed as mentioned above, such heating means is not essential when the plastic material that is molded does not require a heat treatment or vulcanization. Thus in molding thermoplastic compositions the composition material may be brought to a superatmospheric temperature suitable for imparting desired workability and then formed into a sheet from which the mold cavities of the machine are filled at the blanking station. In such case, the material is held in the mold cavities only long enough to cool to a temperature at which the molded bodies may take a "set" so that they may be handled upon being ejected from the mold cavities. In order to hasten the cooling of the molds, cooling means may, if desired, be employed such as causing cold air or cold water to be applied to the mold presenting members and to the mold closing members during one or more portions of their travel as carried by the endless carriers therefor.

While this invention has been described in connection with a specific embodiment, the machine for making molded bodies according to this invention may be constructed and arranged in different ways without departing from the scope and utility of the invention. One such alternative for the organization and construction of a machine embodying this invention has been shown for purposes of further illustration in Figs. 14 and 15.

Figures 14, 15:
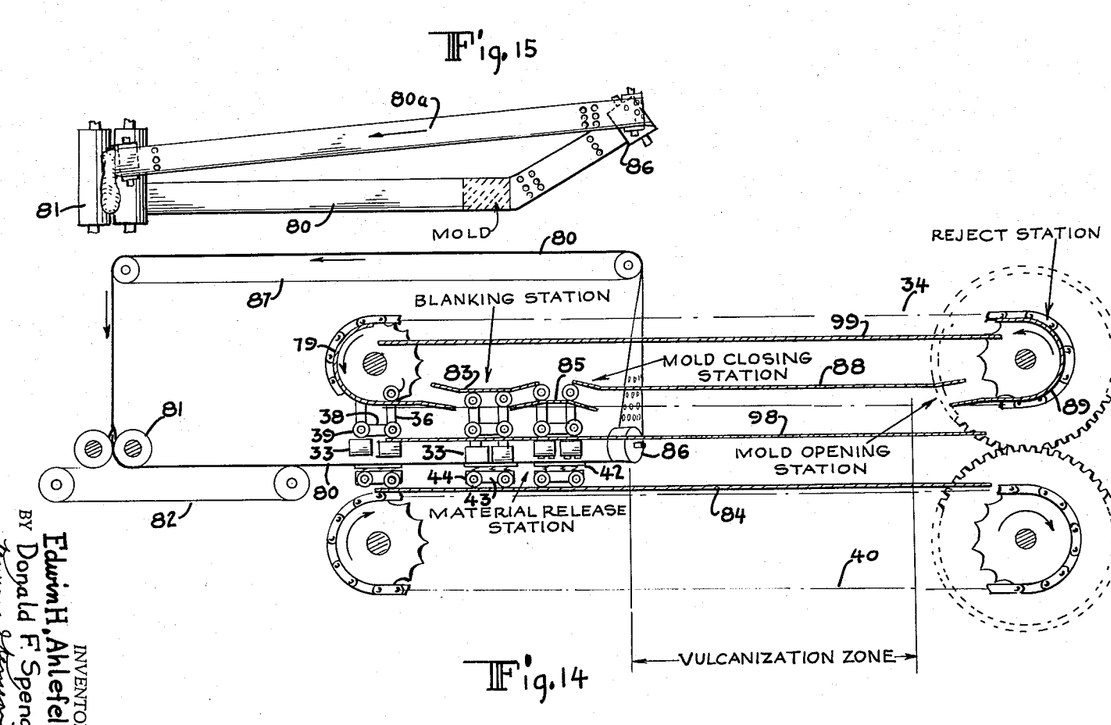
Fig. 14 is a schematic side elevation of an alternative embodiment of this invention.
Fig. 15 is a schematic plan view of the feed means for the embodiment shown in Fig. 14.

The embodiment of this invention shown in Figs. 14 and 15 differs from the embodiment shown in Figs. 1 to 13 primarily with reference to the means for blanking molded bodies from a continuously moving sheet and the means for recovering residual sheet material which does not enter the mold cavities and for returning it to the sheet-forming means whereby the plastic material is continuously formed into a sheet. In the embodiment shown in Figs. 14 and 15 the construction of endless carriers 34 and 40 and the means for mounting and actuating them may be the same as hereinabove described in connection with the embodiment shown in Figs. 1 to 14. Moreover, the carriage blocks 38 which are carried by the carrier 34 and the mold presenting members 33 together with the pusher rods 36 and the rollers 37 rotatively mounted on the ends thereof may be as hereinabove described. Similarly, the carriage blocks 43 and the mold closing members 42 presented thereby may be as hereinabove described but serve as well as blanking members when at the blanking station.

The endless carriers 34 and 40 travel in the direction indicated by the arrows and as the mold closing members 42 which are carried by the lower carrier 40 approach the upper reach of that carrier they come into directly opposed relation with the mold presenting members 33. Initially the mold presenting members are held somewhat retracted by the action of the cam track 79. It is to be noted that in this embodiment the continuous sheet 80 of plastic material, such as unvulcanized rubber, is fed, as taken from the warm-up mill 81, by the endless conveyor 82 so as to be deposited on the upper surfaces of the mold closing members 42 as the carriage blocks 43 come to the level attained thereby in their travel on the upper reach of the conveyor 40. As each of the carriage blocks 43 continues to move the mold presenting members 33 are pressed downwardly by the action of the cam track 83 on the rollers 37. At the same time the rollers 44 of the carriages 43 are supported by the track 84. The result of this action is that the plastic material of the continuous sheet is pressed into the mold cavities of the members 33. At this station and until the mold opening station is reached, the rollers 39 of the carriage blocks 38 preferably are supported by the tracks 98.

The next step in the operation is to remove the residual material from the sheet 80 prior to entry of the molded bodies into the vulcanization zone. This is accomplished by elevation of the mold presenting members 33 induced by the action of the cam track 85 on the rollers 37. When the mold presenting members 33 are thus elevated, the mold cavities remain filled and the residual sheet material, which is continuous except for the apertures blanked therefrom, may be taken off to one side of the machine, the travel being induced by the action of the synchronously driven cylinder 86, as shown schematically in Fig. 15. This residual sheet material 80a may then be returned by any suitable means such as the conveyor 87 for return to the bank of unformed plastic material in the sheet-forming means 81.

The residual sheet material having been taken out of the way and recovered, the mold cavities are then closed at the mold closing station. This is accomplished by the influence of the cam track 88 on the rollers 37 whereby the mold presenting members 33 are again brought into pressure contact with the mold closing members 42. The mold cavities thus closed remain closed during passage through the vulcanization zone. After the vulcanization has been completed, the opening of the mold cavities and the ejection of the molded bodies therefrom may be accomplished in the manner hereinabove described in connection with the embodiment shown in Figs. 1 to 14, this action being induced by the cam track 89, which may be substantially identical in shape and action with the cam track 47 of the previously described embodiment. During travel along the upper reach of the conveyor 34 the rollers 37 travel along and are supported by the tracks 99.

Figure 16:
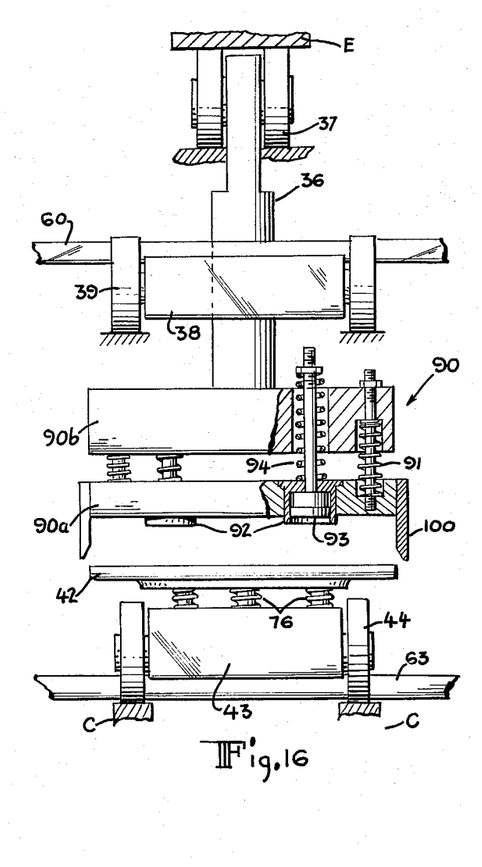
Fig. 16 is an end elevation, partly in section, of the upper and lower carriage assemblies in opposed relation, showing an alternative construction.

While a preferred type of mold presenting member has been shown and described in connection with the embodiment shown in Figs. 1 to 15, it is apparent that the mold presenting members may take different forms, and an alternative form has been shown for purposes of illustration in Fig. 16. In Fig. 16 the carriage blocks 43 that are carried by the lower carrier 40 may be identical with that shown in detail in Figs. 5, 6 and 7, including the mold closing member 42 which is yieldably supported by the springs 76 and the wheels 44 rotatively mounted on each side thereof. In the embodiment of Fig. 16 the mold presenting member, which is indicated generally by the reference character 90, is made in two parts, namely, a mold presenting platen 90a and a backing platen 90b. The platens 90a and 90b are normally held in spaced relation by a plurality of springs 91. These springs have sufficient resistance to compression so that the platens 90a and 90b remain substantially separated during the blanking operation when the plastic material, such as unvulcanized rubber, is pressed into the mold cavities presented by the blanking members 92. The ejection plungers 93 are shown in their normal position for providing a bottom for the mold cavities during blanking, the platens 90a and 90b being in the separated position shown. In such position the spring 94 for each plunger 93 is in its fully extended position. However, after the blanking step has been completed and the residual sheet material has been taken away, platens 90a and 90b are moved from the open mold position shown in Fig. 16 until the blanking members 92 come into contact with the mold closing members 42, thereby closing the mold cavities. This action is induced as by the confinement of the parts between tracks E and C of the embodiment of this invention shown in Figs. 1 to 14. However, when utilizing the carriage construction shown in Fig. 16 the closing motion is continued until the platen 90b is brought flush with the platen 90a, with resultant compression of the springs 91 whose unit strength is less than the unit strength of the springs 76 which support the mold closing members 42. When the treating step has been completed, the parts first assume the position shown in Fig. 16. Further retraction of the platens 90a and 90b toward the carriage blocks 38 then causes the exposed end of the pin portion of the ejection plunger 93 to strike against the carriage block 38, thereby causing the plunger 93 to be thrust forward for ejecting the finished molded bodies from the mold cavities. Marginal guides 100 may be used to assist in obtaining accurate registration between the mold closing members 42 and the mold presenting members 40.

While in the embodiments shown in the drawings and described hereinabove the mold presenting members have been carried by the upper of the two endless carriers, it is obvious that, if desired, the mold presenting members may be carried by the lower carrier instead of the upper carrier.

For purposes of illustrating this invention, the mold cavities have been illustrated as suitable for molding a simple disc of substantially uniform thickness. Discs of this type may be made in a number of different sizes and are adapted for a number of different uses. However, a variety of other shapes may be molded depending on the intended usage of the molded bodies for such purposes as bumpers, stops, pads, feet, washers, rubber heels, suction cups, engine mountings and the like. For any such purposes the inner surfaces of the blanking members have the peripheral contour for the molded body to be made and the ejection plunger which constitutes the bottom of the mold cavity may be provided so as to have whatever configuration is required. When the mold closing members are in the form of flat platens, the resulting molded products have one flat surface. For very many purposes this is what is required. However, when some other configuration is required, then the surface of the mold closing members may have other configurations. Moreover, by providing mold presenting members such as those hereinabove described and illustrated in the drawings which are carried by both the lower endless carrier and the upper endless carrier and having the mold cavities carried by each carrier filled by a blanking operation as illustrated and described herein and brought into opposing relation for confining the contents thereof, molded bodies may be produced whose external configuration may take a very wide variety of forms. In such case, one of the opposing mold cavities constitutes a mold closing member for the other. Moreover, by thus using opposing mold cavities which are brought into registration to confine the contents thereof, plastic compositions of different color may be utilized as, for example, in causing an insert of contrasting color to be embedded in a molded body as, for example, in the manufacture of rubber heels. Moreover, in filling individual mold cavities more than one blanking operation may be employed, if desired, and different colors may be used in successive blanking operations. Moreover, different types of plastic material may be laminated as, for example, in the case of causing sponge rubber to become laminated with a conventional solid rubber base. These and many other variations are illustrative of the different applications to which the machine of this invention is adaptable.

In addition to unvulcanized rubber and thermoplastic compositions, any other composition which is adapted to be formed into a sheet and which is sufficiently workable to be charged into a mold cavity by a blanking operation may be utilized.

As indicated above, the machine of this invention may be modified according to the particular treatment other than the molding per se to which the composition is to be subjected. This machine is of particular utility in connection with the manufacture of molded bodies which require some treatment of the composition employed while confined in a mold cavity. In this connection, steps such as cooling, or merely a dwell for a sufficient period to permit a reaction to take place, is to be considered as a treatment to which the composition is subjected.

The utility and advantage of this invention may be further illustrated in connection with the manufacture of a product such as round door stops about ½ inch in diameter. Such door stops can be made from a rubber composition containing natural rubber compounded with suitable filler and a vulcanizing curative such as sulfur, zinc oxide or the like, the composition being one which may be vulcanized in about 1 minute at a temperature of the order of 350° to 400° F. The compounded rubber composition may be brought to a temperature of about 120° to 200° F. by working it on the sheet-forming means from which the sheet material is taken in sheet form for blanking. For molding such bodies, the mold presenting members may conveniently be about 36 square inches in area, each containing 36 mold cavities. The aforesaid vulcanization time may be obtained by moving the mold cavities through a vulcanization zone substantially 12 feet in length at the rate of about 12 feet per minute. When so constructed and operated, the machine output is substantially 4320 molded units per hour. The only labor expense incident to such production is that required for supplying the sheet-forming machine with fresh unvulcanized rubber composition to make up for that going into the finished product. In view of the return of the residual sheet material to the sheet-forming means the waste of raw material is reduced to less than 1%. By contrast, when such molded bodies are manufactured by using conventional compression molding techniques, the material waste usually is of the order of 15% to 50% and the rubber composition has to be compounded so as to cure more gradually in order to prevent premature setting up of the composition during the preliminary steps of extrusion, cutting of pre-forms and the filling of the mold cavities in the platen of the hydraulic press. These operations together with the slower inherent curing time of the composition as well as the lower curing temperature which is attainable in conventional hydraulic presses result in a much lower production rate in relation to plant installation cost and upkeep. Moreover, such production can be afforded at a much less cost for labor.

We claim:

1. A machine for making molded bodies from plastic material comprising a first endless carrier having at least one elongated substantially linear reach, a succession of mold presenting members carried by said first carrier, each of said members comprising a platen having an open mouthed mold cavity therein surrounded by a margin protruding substantially from the surface of said platen, a bottom member for said mold cavity mounted reciprocatably in said cavity, means for holding said bottom member in normally retracted position, a second endless carrier having an elongated, substantially linear reach in opposed relation to said reach of said first carrier, a succession of mold closing members carried by said second endless carrier, said first and second endless carriers being mounted for orbital travel for successively bringing said mold presenting members and said mold closing members into opposed abutting relation for closing said mold cavities, maintaining said opposed abutting relation during a substantial distance of travel of said members along said reaches of said first and second carriers and then separating said members to open said mold cavities, means for actuating said first and second carriers for synchronized travel of said mold presenting and said mold closing members, means for heating said members and the material contained in said mold cavities during travel of said members while in abutting mold-closing position during travel along said reach, means for bringing a continuous sheet of plastic material into contact with said mold presenting members while traveling therewith, pressing member means, means for bringing pressing surface presented by said pressing member means and said mold presenting members into opposed relation in pressure contact with said sheet while said sheet is disposed therebetween for pressing plastic material from said sheet into said mold cavities by a blanking operation wherein said protruding margin of said mold cavities bites into said sheet during travel of said mold presenting members leaving residual plastic material and then effecting separation of said pressing surface from said mold presenting members, means for recovering said residual plastic material after separation of said pressing surface from said mold presenting members and prior to closing of said mold cavities by said mold closing members, and means for advancing said bottom members from said normally retracted position to advanced position to eject molded bodies from said mold cavities after separation of said closing members therefrom and for returning said bottom members to normally retracted position after ejection of the molded bodies and prior to blanking fresh material into said mold cavities.

2. A machine for making molded bodies from plastic material which comprises a first endless carrier having at least one elongated, substantially linear reach, a second endless carrier having a reach thereof of substantial length in opposed relation to said reach of said first carrier, a carriage member secured to said first carrier for travel therewith, a pusher rod disposed substantially normally to the plane of travel of said first carrier and traversing said first carriage member in longitudinally slidable relation therewith, a mold presenting member secured to said pusher rod adjacent the end thereof projecting toward said second carrier in spaced relation to said first carrier and having a mold cavity therein with its mouth facing said second carrier where said carriers come into opposed relation, cam follower means secured to said pusher rod adjacent the other end thereof, means for synchronously propelling said first and second carriers, means for feeding a sheet of plastic material into position overlying said mouth of said mold cavity while moving substantially synchronously therewith, track means cooperating with said cam follower means for holding said mold presenting member and the mouth of said mold cavity in pressure contact with said sheet during said synchronous movement of said member and said sheet, a blanking member, means for moving a surface of said blanking member in synchronism with the movement of said sheet into position at which it presses plastic material from said sheet into said mold cavity leaving residual sheet material while said mold presenting member is held in pressure contact with said sheet by said track means, means for separating said surface of said blanking member from said mold presenting member, means for recovering said residual sheet material after said blanking member becomes separated from said mold presenting member, a mold closing member secured to said second carrier for travel in opposed registration with said mold presenting member where said reaches of said first and second carriers are in opposed relation, means coacting with said mold closing member for maintaining it in pressure contact with said mouth of said mold cavity during travel therewith where said reaches of said first and second carriers are in opposed relation, track means cooperating with said cam follower means for holding said mold presenting member in pressure contact with said mold closing member during said travel, means for thereafter separating said mold closing member from said mold presenting member and means for ejecting a molded body from said mold cavity.

3. A machine according to claim 2 wherein said means for ejecting a molded body from said mold cavity comprises a plunger slidably mounted for reciprocation in said mold cavity and having a portion thereof protruding from said mold presenting member toward said carriage member, means for normally maintaining said plunger in position substantially retracted within said mold cavity, cam track means that coacts with said cam follower means for retracting said mold presenting member relative to said carrier responsive to continued travel of said carriage with said carrier and means responsive to said retraction of said mold presenting member for advancing said plunger and thereby ejecting a molded body from said mold cavity.

4. A machine for making molded bodies from plastic material comprising a first endless carrier having at least one elongated substantially linear reach, a succession of mold presenting members carried by said first carrier, each of said members having an open mouthed mold cavity therein having a blanking margin at the mouth thereof, a bottom member for said mold cavity mounted reciprocatably in said cavity, means limiting the reciprocatory travel of said bottom member between position substantially retracted within said cavity and position advanced for ejecting a molded body from said cavity, a second endless carrier having an elongated substantially linear reach in opposed relation to said reach of said first carrier, a succession of mold closing members carried by said second endless carrier, said first and second endless carriers being mounted for orbital travel for successively bringing said mold presenting members and said mold closing members into opposed abutting relation for closing said mold cavities, maintaining said opposed abutting relation during a substantial distance of travel of said members along said reaches of said first and second endless carriers and then separating said members to open said mold cavities, means for actuating said first and second endless carriers for synchronized travel of said mold presenting and said mold closing members, means for bringing a continuous sheet of plastic material into contact with said mold presenting members while traveling therewith, pressing member means, means for bringing pressing surface presented by said pressing member means and said mold presenting members into opposed relation in pressure contact with said sheet while said sheet is disposed therebetween for pressing plastic material from said sheet into said mold cavity by a blanking operation wherein said blanking margin of said mold cavity bites into said sheet during travel of said mold presenting members leaving residual plastic material and then effecting separation of said pressing surface with respect to said mold presenting members, means for recovering said residual plastic material after separation of said pressing surface with respect to said mold presenting members and means for advancing said bottom members from said retracted position to said advanced position to eject molded bodies from said cavities after separation of said closing members therefrom.

5. A machine for making molded bodies from plastic material comprising a first endless carrier having an elongated substantially linear reach, a succession of mold presenting members carried by said first carrier, each of said members having an open mouthed mold cavity therein having a blanking margin, a bottom member for said mold cavity mounted reciprocatably in said cavity, means limiting the reciprocatory travel of said bottom member between positions substantially retracted within said cavity and positions advanced for ejecting a molded body from said cavity, a second endless carrier having an elongated substantially linear reach in opposed relation to said reach of said first carrier, a succession of mold closing members carried by said second endless carrier, said first and second endless carriers being mounted for orbital travel for successively bringing said mold presenting members and said mold closing members into opposed abutting relation for closing said mold cavities, maintaining said opposed abutting relation during a substantial distance of travel of said members along said reaches of said first and second endless carriers and then separating said members to open said mold cavities, means for actuating said first and second endless carriers for synchronized travel of said mold presenting and mold closing members, a wheel presenting a peripheral surface adapted for carrying thereon a sheet of plastic material, means for mounting said wheel for rotation with movement of said peripheral surface in juxtaposed position and in the same direction of travel with respect to successive mold presenting members during a portion of the orbital travel of said mold presenting members while being carried by said first endless carrier, means for supplying a continuous sheet of plastic material onto the said surface of said wheel with movement of said sheet with said surface into pressure contact between said surface of said wheel and successive mold presenting members and at a synchronized rate of travel therewith thereby blanking portions of said sheet into said mold cavities comprised in successive mold presenting members leaving residual material of said sheet on the said surface of said wheel, means for removing said residual material of said sheet from said surface of said wheel, and means for advancing said bottom members from said retracted position to said advanced position to eject molded bodies from said cavities after separation of said closing members therefrom.

6. A machine for making molded bodies from plastic material comprising a first endless carrier having at least one elongated substantially linear reach, a succession of mold presenting members carried by said first carrier, each of said members comprising a platen having a plurality of open mouthed mold cavities therein each of which has a blanking margin at the mouth thereof protruding from the surface of said platen, a bottom member for each of said mold cavities mounted reciprocatably in said mold cavity, a plurality of stems passing through respective apertures in said platen in substantially normal relation to said platen, each of said stems having one of said bottom members secured to one end thereof and having the other end thereof protruding substantially from the surface of said platen opposite to that presenting said mold cavities, stop means which limits the retraction of said bottom member in said mold cavity, a second endless carrier having an elongated substantially linear reach in opposed relation to said reach of said first carrier, a succession of mold closing members carried by said second endless carrier, said first and second endless carriers being mounted for orbital travel for successively bringing said mold presenting members and said mold closing members into opposed abutting relation for closing said mold cavities, maintaining said abutting relation during a substantial distance of travel of said members along said reaches and then separating said members to open said cavities, means for actuating said first and second endless carriers for synchronized travel of said mold presenting and said mold closing members, means for bringing a continuous sheet of plastic material into contact with said mold presenting members while traveling therewith, means for pressing said sheet of plastic material against said mold presenting members while said sheet is traveling with said mold presenting members to press plastic material into said mold cavities by a blanking operation wherein said blanking margins of said mold cavities bite into said sheet leaving residual plastic material, means for recovering the residual plastic material prior to bringing said mold presenting members and said mold closing members into abutting relation for said travel along said reach, and pushing member means carried with each of said platens and mounted for reciprocatory movement substantially normally with respect to each said platen on the side thereof from which said stems protrude, and means responsive to continued movement of said mold presenting members after separation of said mold closing members therefrom for effecting as to each of said mold presenting members successively relative movement between said platen and said pushing member means carried therewith for pressing said stems and thereby advancing said bottom members for ejecting molded bodies from said mold cavities and permitting return of said bottom members to normally retracted position.

7. A machine for making molded bodies from plastic material which comprises a first endless carrier having at least one elongated linear reach, a second endless carrier having a reach thereof of substantial length in opposed relation to said reach of said first carrier, means for synchronously propelling said first and second endless carriers, a succession of mold presenting members secured to said first carrier for travel therewith, each of said members having an open mouthed mold cavity therein with its mouth facing said second carrier where said carriers come into opposed relation, means for feeding a sheet of plastic material into position overlying said mouth of said mold cavity of each of said successive mold presenting members while moving substantially synchronously therewith, means for holding said mold presenting member and the mouth of said cavity in pressure contact with said sheet during said synchronous movement of said member and said sheet, a blanking member, means for bringing a surface of said blanking member into contact with said sheet while said sheet is overlying said mold cavity, moving said surface synchronously with said sheet, pressing plastic material from said sheet into said mold cavity during said synchronous moving leaving residual sheet material, and then separating said surface from said sheet, means for recovering said residual sheet material after said blanking member becomes separated from said sheet, mold closing members secured to said second carrier for travel in opposed registration, respectively, with said mold presenting members where said reaches of said first and second carriers are in opposed relation, means for maintaining said mold closing members in contacting abutting relation with the mouths of said mold cavities for closing same during said travel where said reaches of said first and second carriers are in opposed relation, means for successively separating said mold closing members from said mold presenting members after said travel and means for thereafter ejecting molded bodies from said mold cavities.

(References on following page)

References Cited in the file of this patent

UNITED STATES PATENTS

| | | | |
|---|---|---|---|
| 724,588 | Koneman | Apr. 7, | 1903 |
| 1,001,952 | Henley | Aug. 29, | 1911 |
| 1,297,644 | Boyer | Mar. 18, | 1919 |
| 1,525,629 | Thompson | Feb. 10, | 1925 |
| 1,619,210 | MacLaren | Mar. 1, | 1927 |
| 1,750,708 | Edwards | Mar. 18, | 1930 |
| 1,969,323 | Person | Aug. 7, | 1934 |
| 2,103,860 | Mazzeo | Dec. 28, | 1937 |
| 2,300,290 | Johnson et al. | Oct. 27, | 1942 |
| 2,365,804 | Clerke | Dec. 26, | 1944 |
| 2,593,439 | Gora | Apr. 22, | 1952 |
| 2,651,809 | Mechur et al. | Sept. 15, | 1953 |
| 2,657,426 | Gora | Nov. 3, | 1953 |
| 2,699,574 | Gilbert | Jan. 18, | 1955 |
| 2,745,135 | Gora | May 15, | 1956 |
| 2,792,591 | Cardot et al. | May 21, | 1957 |
| 2,829,756 | Gercke et al. | Apr. 8, | 1958 |

FOREIGN PATENTS

| | | | |
|---|---|---|---|
| 200,047 | Australia | Apr. 7, | 1955 |

UNITED STATES PATENT OFFICE

CERTIFICATE OF CORRECTION

Patent No. 2,958,095                        November 1, 1960

Edwin H. Ahlefeld, Jr., et al.

It is hereby certified that error appears in the printed specification of the above numbered patent requiring correction and that the said Letters Patent should read as corrected below.

Column 2, line 21, for "of", second occurrence, read -- or --; column 4, line 31, for "arming" read -- warming --; column 7, line 42, for "26" read -- 36 --.

Signed and sealed this 25th day of April 1961.

(SEAL)
Attest:
ERNEST W. SWIDER
Attesting Officer

DAVID L. LADD
Commissioner of Patents